(12) United States Patent
Flynn (10) Patent No.: US 7,213,611 B2
(45) Date of Patent: May 8, 2007

(54) VALVE ASSEMBLY

(75) Inventor: William Thomas Flynn, Horton, MI (US)

(73) Assignee: Eaton Corporation, Cleveland, OH (US)

( * ) Notice: Subject to any disclaimer, the term of this patent is extended or adjusted under 35 U.S.C. 154(b) by 289 days.

(21) Appl. No.: 11/012,624

(22) Filed: Dec. 15, 2004

(65) Prior Publication Data

US 2006/0124174 A1    Jun. 15, 2006

(51) Int. Cl.
*G05D 16/02* (2006.01)

(52) U.S. Cl. .............. 137/505.25; 251/149.6; 251/297; 277/439

(58) Field of Classification Search .......... 137/505, 137/505.25; 277/439; 251/64, 75, 297, 251/149.6
See application file for complete search history.

(56) References Cited

U.S. PATENT DOCUMENTS

| | | | | |
|---|---|---|---|---|
| 2,366,832 A | * | 1/1945 | Christenson | 277/439 |
| 2,446,355 A | * | 8/1948 | Wright | 137/505 |
| 3,196,901 A | * | 7/1965 | Phillipps | 137/505.25 |
| 3,511,266 A | * | 5/1970 | Phlipot | 137/505.25 |
| 3,995,656 A | * | 12/1976 | Mills, Jr. | 137/505.25 |
| 4,825,903 A | * | 5/1989 | Ochs et al. | 137/505.25 |
| 4,924,904 A | * | 5/1990 | Carter | 137/505.25 |
| 5,143,347 A | * | 9/1992 | Lee et al. | 251/149.6 |
| 5,255,711 A | * | 10/1993 | Reeds | 137/505.41 |
| 5,290,009 A | * | 3/1994 | Heilmann | 251/149.6 |
| 6,273,130 B1 | * | 8/2001 | Cossins | 137/505.25 |
| 2003/0075219 A1 | * | 4/2003 | Carroll | 137/505.25 |

* cited by examiner

*Primary Examiner*—Stephen M. Hepperle
(74) *Attorney, Agent, or Firm*—Dykema Gossett PLLC (57) ABSTRACT

A valve assembly includes a body having a bore and a valve received within the bore for movement between an open position and a closed position. First and second sealing members are secured for movement with the valve and are positioned between the valve and the body such that an internal fluid pressure within the bore is applied to a first side of the sealing members and a common reference pressure is applied to a second side. An axial force imparted on the valve adjacent the second sealing member is less than an axial force imparted on the valve adjacent the first sealing member. A resiliently compressible member is positioned to bias the valve toward the normally open position. The valve is moved to the closed position when the internal fluid pressure exceeds a predetermined pressure and returns to the open position when the internal fluid pressure is substantially less than the predetermined pressure.

23 Claims, 7 Drawing Sheets

VALVE ASSEMBLY

FIELD OF THE INVENTION

The present invention relates generally to valve assemblies for hydraulic systems and, more particularly, to an over-pressure protection valve assembly for use in a hydraulic system.

BACKGROUND OF THE INVENTION

Devices for monitoring fluid flow and pressure in a hydraulic system and responding to pressure and flow transients that immediately follow a ruptured hydraulic line, hose or hydraulic device leak, so-called "hydraulic fuses," are known in the art. Hydraulic fuses are typically in-line valves that protect a hydraulic system or subsystem by sensing increased flow through the valve, resulting from a rupture line or leak, and closing the valve to block fluid flow upstream of the rupture to prevent further spillage.

While hydraulic fuses adequately protect a hydraulic system from fluid loss, they are generally incapable of protecting a hydraulic system from over-pressurization. To prevent over-pressurization, hydraulic systems or subsystems typically include a burst disk, pressure relief valve or other pressure relief device. While these devices effectively vent pressurized fluid when a hydraulic system or subsystem is over-pressurized, they exhibit a number of limitations. Among other limitations, burst disks must be replaced once they are ruptured. Additionally, unlike in-line hydraulic fuses, burst disks require additional plumbing for discharging pressurized fluid. Another limitation of burst disks is that they expose a downstream portion of the hydraulic system to a momentary high-pressure impulse prior to and during rupture. Moreover, burst disks have a tendency to fail due to low-pressure cycling fatigue.

Like burst disks, pressure relief valves also require additional plumbing for fluid discharge and expose a downstream portion of the hydraulic system to a momentary high-pressure impulse prior to the valve opening. Another limitation of pressure relief valves is that they are relatively large in size and weight, rendering them unsatisfactory for use in hydraulic systems where size and weight must be minimized.

For at least these reasons, a need exists for a relatively small and lightweight, in-line hydraulic device that monitors static and dynamic fluid pressure in a hydraulic system or subsystem and closes virtually instantaneously upon detection of an over-pressure condition to prevent a portion of the hydraulic system downstream of the valve from being exposed to the over-pressure condition and any associated pressure impulse. Moreover, a need exists for an in-line hydraulic device that automatically reopens when the over-pressurized condition returns to a safe pressure condition.

SUMMARY OF THE INVENTION

A valve assembly is provided that includes a body having a bore and a longitudinal axis. A valve is received within the bore and is configured for axial movement between an open position in which fluid flow through the body is permitted and a closed position in which fluid flow through the body is prevented. First and second sealing members are secured for movement with the valve and are positioned between the valve and the body such that an internal fluid pressure within the bore is applied to a first side of the first and second sealing members and a common reference pressure is applied to a second side of the first and second sealing members. A first surface area portion of the bore adjacent the first sealing member is greater than a second surface area portion of the bore adjacent second sealing member such that an axial force imparted on the valve adjacent the second sealing member is less than an axial force imparted on the valve adjacent the first sealing member. A resiliently compressible member is positioned to bias the valve toward the open position. The valve is normally in the open position and is moved to the closed position when the internal fluid pressure exceeds a predetermined pressure. The valve is adapted to return to the open position when the internal fluid pressure is substantially less than the predetermined pressure.

Other aspects of the invention will be apparent to those skilled in the art after review of the drawing and detail description provided below.

BRIEF DESCRIPTION OF THE DRAWINGS

The present invention will now be described, by way of example, with reference to the accompanying drawings, in which.

DETAILED DESCRIPTION OF THE INVENTION

Figure 1:
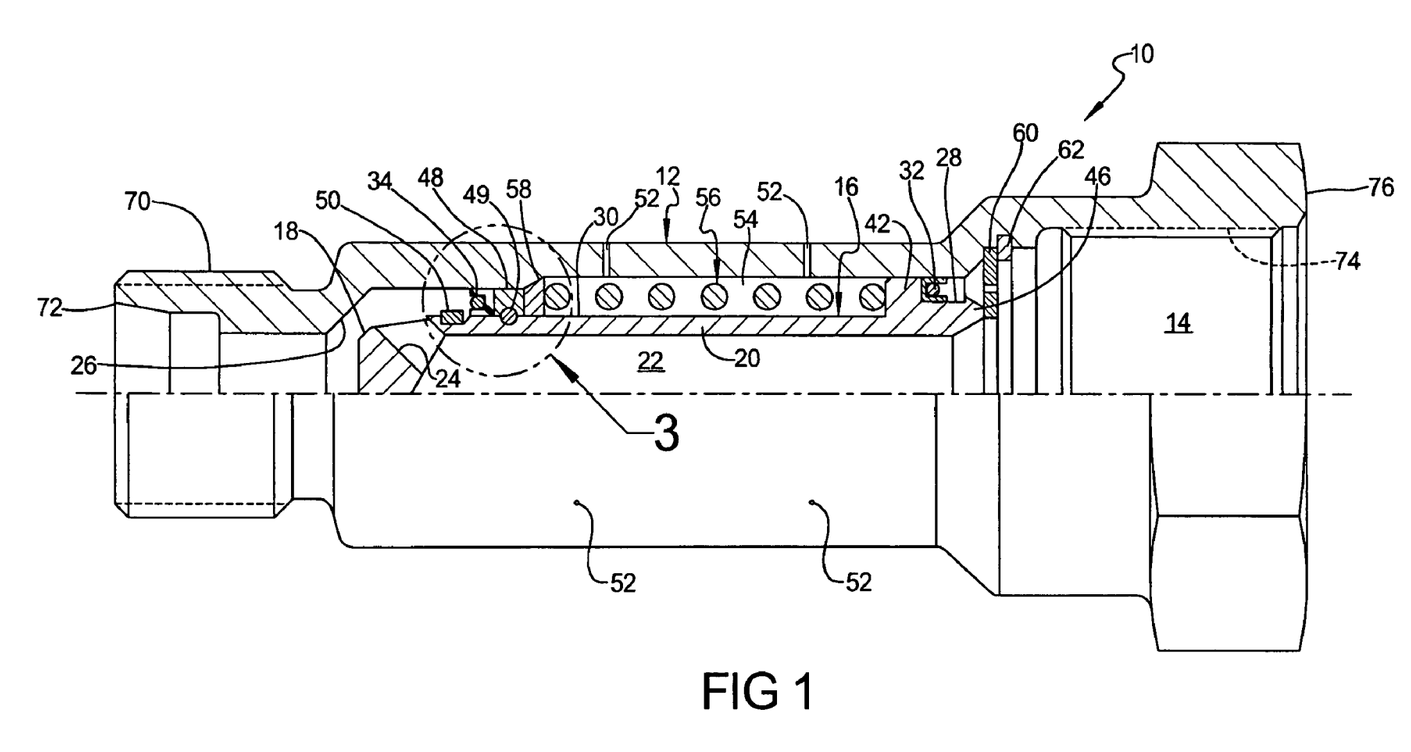
FIG. 1 is a partial cross-sectional view of a valve assembly according to an embodiment of the present invention, showing a valve in an open position.
Figure 2:
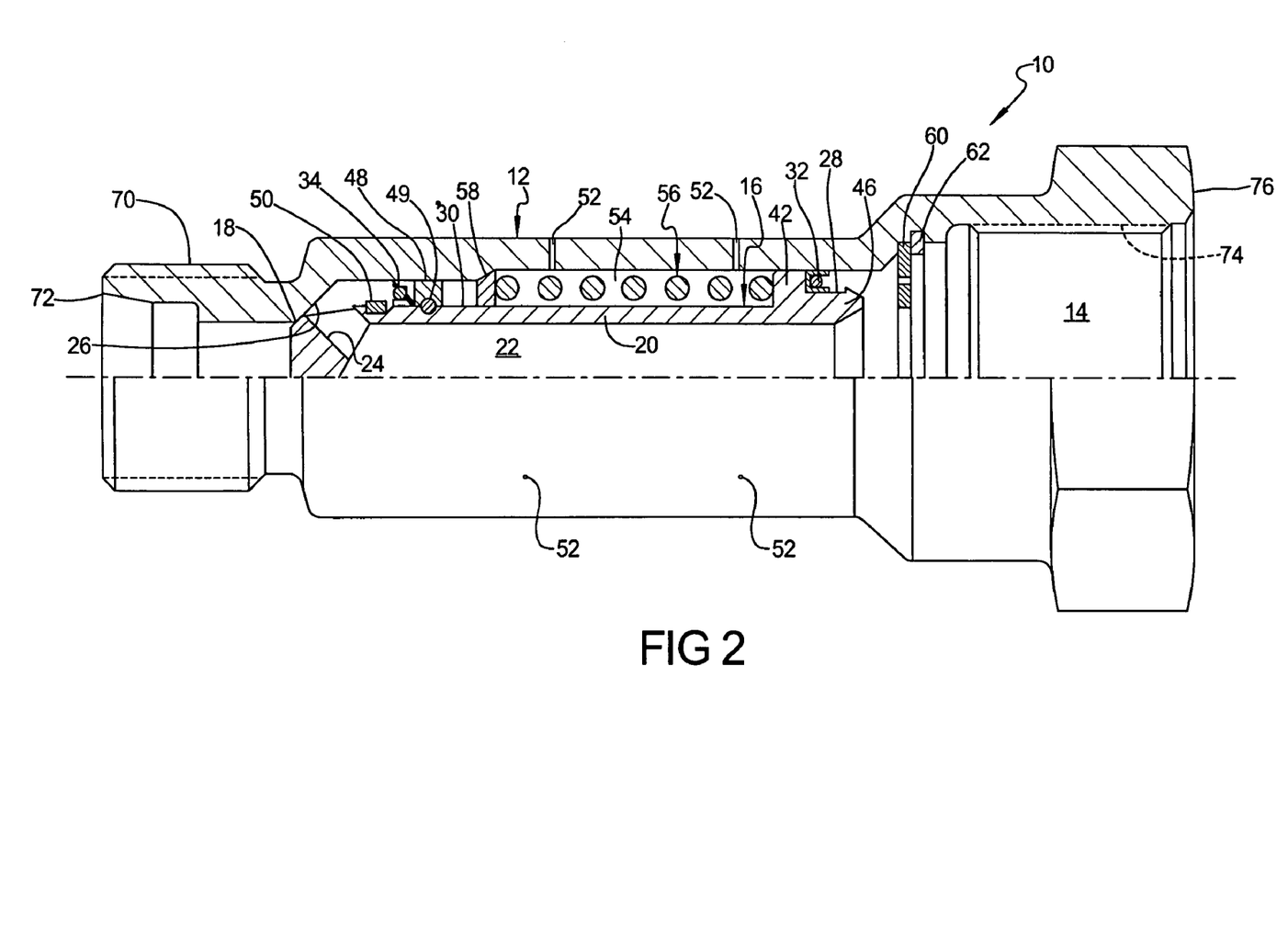
FIG. 2 is a partial cross-sectional view of a valve assembly of FIG. 1, showing the valve in a closed position.

FIGS. 1 and 2 illustrate a partial cross-sectional view of a valve assembly 10 shown in accordance with an embodiment of the present invention. In the illustrated embodiment, valve assembly 10 includes a body 12 having a bore 14 and a longitudinal axis A—A. A valve 16 is received within the bore 14 and is configured for axial movement between an open position (e.g., FIG. 1) in which fluid flow through the body 12 is permitted and a closed position (e.g., FIG. 2) in which fluid flow through the body 12 is prevented.

In an embodiment, valve 16 is generally cylindrical and includes a head portion 18 and an elongated stem portion 20 that includes a fluid flow passage 22 extending therethrough. At least one channel 24 extends through head portion 18 to provide fluid flow passage 22 in communication with the portion of bore 14 that is downstream of valve 16 when valve 16 is in the open position. Head portion 18 is adapted to engage an inner surface 26 of bore 14 downstream of channel 24 to prevent fluid flow through bore 14 when valve 16 is moved to the closed position. Bore 14 and valve 16 provide a low pressure drop fluid flow path through valve assembly 10 when the internal fluid pressure within valve assembly 10 is below a predetermined pressure discussed herein below.

Referring still to FIGS. 1 and 2, valve 16 is provided with a first outer surface 28 having a first diameter and a second outer surface 30 having a second diameter. A first sealing member 32 is secured for axial movement with valve 16 and is adapted to provide a seal between first outer surface 28 of valve 16 and body 12. Similarly, a second sealing member 34 is secured for axial movement with valve 16 and is adapted to provide a seal between second outer surface 30 of valve 16 and body 12.

Figure 3A:
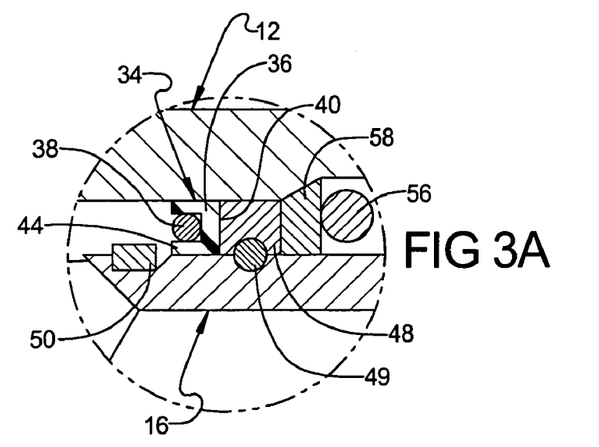
FIG. 3A is a detailed view of the valve assembly shown in FIG. 1, illustrating a valve configuration according to an embodiment of the invention.
Figure 3B:
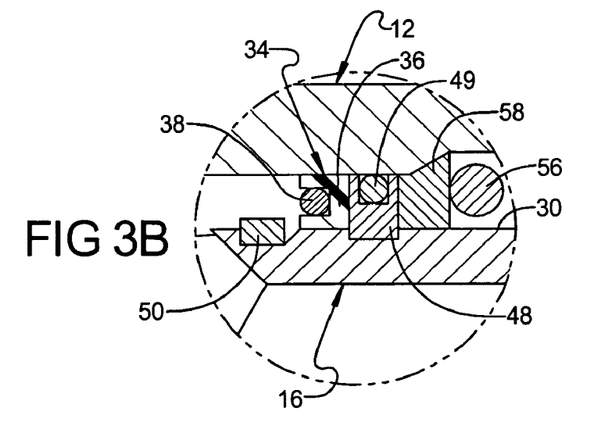
FIG. 3B is a detailed view of the valve assembly shown in FIG. 1, illustrating a valve configuration according to another embodiment of the invention.

In an embodiment, first and second sealing members 32, 34 are spring energized seals that include a polymeric U-cup 36 and an energizing spring 38 received in a U-shaped opening of the U-cup 36 (see, e.g., FIGS. 3A–3B). In a particular configuration, U-cup 36 is made from a fluoroplastic, such as PTFE, to prevent the U-cup material from bleeding into the body 12 material during prolonged periods of valve 16 being in the open position without movement.

Figure 3C:
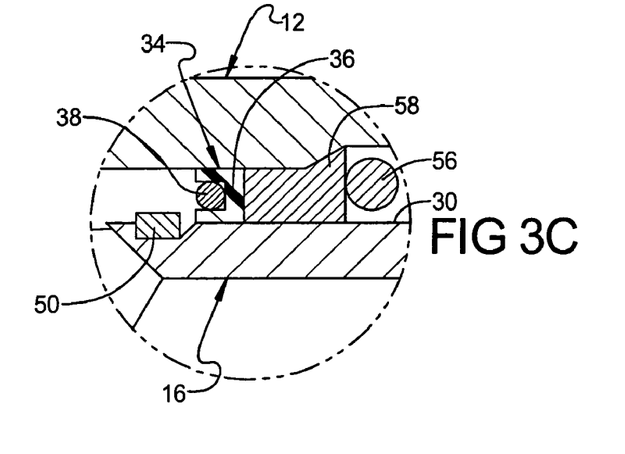
FIG. 3C is a detailed view of the valve assembly shown in FIG. 1, illustrating a valve configuration according to another embodiment of the invention.

As shown in FIGS. 1 and 2, a closed end 40 of first sealing member 32 abuts a shoulder 42 on valve 16 and an open end 44 of first sealing member 32 is enagagable with a projection 46 on first outer surface 28 of valve 16 to secure first sealing member 32 on valve 16. As shown in FIG. 3, a closed end 40 of second sealing member 34 abuts a first retainer 48 that is secured for axial movement with valve 16 and an open end 44 of second sealing member 34 is enagagable with a second retainer 50, such as a snap ring, which is secured to valve 16.

As shown in FIG. 3A, retainer 48 may include a retaining ring 49 that engages second outer surface 30 of valve 16 to secure first retainer 48 to valve 16. Alternatively, first retainer 48 may be received in a recess in second outer surface 30 of valve 16 and secured therein by a retaining ring 49 that engages a groove in retainer 48, as shown in FIG. 3B, and biases first retainer 48 into the recess in second outer surface 30.

Referring again to the embodiment of the invention shown in FIGS. 1 and 2, body 12 also includes at least one bleed hole 52 that provides the exterior of body 12 in communication with bore 14. First and second sealing members 32, 34 are positioned axially fore and aft of bleed hole 52, respectively, such that each sealing member 32, 34 is subjected to a common reference fluid pressure (e.g., external fluid pressure) and an internal fluid pressure within the bore 14 of body 12. In the illustrated embodiment, the internal fluid pressure within bore 14 is applied to the open end 44 of first and second sealing members 32, 34 and the common reference pressure is applied to the closed end 40 of first and second sealing members 32, 34.

Referring still to FIG. 1, a first portion of bore 14 adjacent first sealing member 32 is greater in diameter than a second portion of bore 14 adjacent second sealing member 34. When so configured, a first surface area portion of bore 14 adjacent first sealing member 32 is greater than a second surface area portion of bore 14 adjacent second sealing member 34. In an embodiment, the common reference pressure (e.g., external fluid pressure) is lower than the internal fluid pressure within bore 14 such that the internal fluid pressure within bore 14 that is applied against the open end 44 of each sealing member 32, 34 forces the sealing members 32, 34 toward each other. By virtue of the disparity in surface area between the first and second portions of bore 14 adjacent first and second sealing members 32 and 34, respectively, the axial force imparted on valve 16 adjacent second sealing member 34 is less than the axial force imparted on valve 16 adjacent first sealing member 32, as demonstrated below:

$$A_1 > A_2$$

$$F_1 = (P_{Internal})(A_1) > F_2 = (P_{Internal})(A_2)$$

wherein:

$A_1$=relevant surface area of a first portion of the bore adjacent the first sealing member;

$A_2$=relevant surface area of a second portion of the bore adjacent the second sealing member;

$F_1$=force exerted on the valve adjacent the first sealing member;

$F_2$=force exerted on the valve adjacent the second sealing member; and $P_{Internal}$=internal fluid pressure within the bore.

The imbalance of force imparted on valve 16 biases the valve toward the closed position. Accordingly, any internal fluid pressure greater than the reference pressure (e.g., external pressure) will function to force valve 16 toward the closed position.

As illustrated in FIGS. 1 and 2, second outer surface 30 of valve 16 is removed from inner surface 26 of bore 14 to form a pocket 54 within which is received a resiliently compressible member 56, such as a compression spring, positioned to bias valve 16 toward the open position. In an embodiment, a first end of resiliently compressible member 56 abuts shoulder 42 of valve 16 and a second end of resiliently compressible member 56 abuts an internal shoulder of body 12. In the configuration shown in FIGS. 1 and 2, the internal shoulder of body 12 is a spring seat 58 that is received in body 12 with valve 16 during assembly and is inhibited from axial movement in at least one direction by virtue of its engagement with body 12. In the embodiment shown in FIG. 3C, valve seat 58 also functions as a retainer member for second sealing member 34, which eliminates the need for retainer 48.

Once valve 16 is received into body 12 during assembly, a valve retaining member 60 is secured within body 12 and is engaged by valve 16 in the open position to prevent valve 16 from being pushed out of body 12 by resiliently compressible member 56. In the embodiment illustrated in FIGS. 1 and 2, valve retaining member 60 is secured within body 12 by a retaining ring 62, such as a snap ring, which is secured in a groove in an inner surface of body 12.

In an embodiment, resiliently compressible member 56 is pre-loaded when valve 16 is secured within body 12 to bias valve 16 toward the open position shown in FIG. 1. The amount of pre-load is generally equal to the difference in surface area of the first and second sealing members multiplied by a predetermined pressure, minus a combined static break-away force required to unseat first and second sealing members 32, 34 from their stationary engagement with the inner wall of bore 14.

During operation of valve assembly 10, valve 16 is normally in the open position and is moved to the closed position when the internal fluid pressure in bore 14 exceeds a predetermined pressure. In an embodiment, the predetermined pressure is approximately equal to the pressure at which the force imparted on valve 16 by first sealing member 32 exceeds a sum of the forces imparted on the valve by second sealing member 34, and resiliently compressible member 56 and the combined static break-away force required to unseat first and second sealing members 32, 34 from their stationary engagement with the inner wall of bore 14. Since the static break-away force is relatively high compared to the dynamic sliding force required to move first and second sealing members 32, 34 relative to the inner wall of bore 14, the valve 10 snaps closed once the force imparted on valve 16 by first sealing member 32 exceeds a sum of the forces imparted on the valve by second sealing member 34, and the resiliently compressible member 56, and the combined static break-away force require to unseat first and second sealing members 32, 34 from their stationary engagement with the inner wall of bore 14.

Unlike some prior art valve assemblies that gradually close as the internal fluid pressure approaches the actuation pressure, there are no intermediate valve travel positions between the open and closed positions—the valve 16 is either in the open position or the closed position. In contrast to other prior art valve assemblies, valve 16 is adapted to return to the open position when the internal fluid pressure is substantially less than the predetermined pressure—a resetting feature that allows the valve 10 to continue to operate after the internal pressure exceeds the predetermined pressure and is then significantly reduced. This feature prevents valve 16 from cycling between the open and closed positions with small internal fluid pressure fluctuations around the predetermined fluid pressure. In an embodiment, the internal fluid pressure at which the valve 16 returns to the open position is approximately one-fifth the predetermined pressure; however, the return pressure will depend on various factors, including the static break-away force required to unseat first and second sealing members 32, 34 from their stationary engagement with the inner wall of bore 14 and the spring-force exerted by resiliently compressible member 56.

In view of the foregoing description, it will be appreciated that valve assembly 10 continuously "monitors" the pressure within bore 14 and the corresponding fluid line or system within which the valve assembly is installed, and functions in static or dynamic fluid flow conditions to isolate the fluid line or system components on the downstream side of valve 16 from potentially damaging increases in fluid pressure on the upstream side of valve 16. It will also be appreciated that valve assembly 10 does not need to be replaced once valve 16 is actuated, since valve 16 automatically reopens when the over-pressurized condition returns to a safe pressure condition.

If desired, valve assembly 10 can be configured for use as a standard in-line device that detects an over-pressure condition at its inlet and closes virtually instantaneously to prevent the over-pressure condition and any impulse pressure spikes from exiting the valve assembly's outlet. When so configured, body 12 may include a threaded male connector 70 on its downstream end 72 and a threaded female connector 74 on its upstream end 76 (see e.g., FIGS. 1 and 2), or any combination of industry standard connectors. Furthermore, valve assembly 10 of the present invention is not limited to a specific size and can cover a wide range of both conventional and unconventional sizes.

Figure 4:
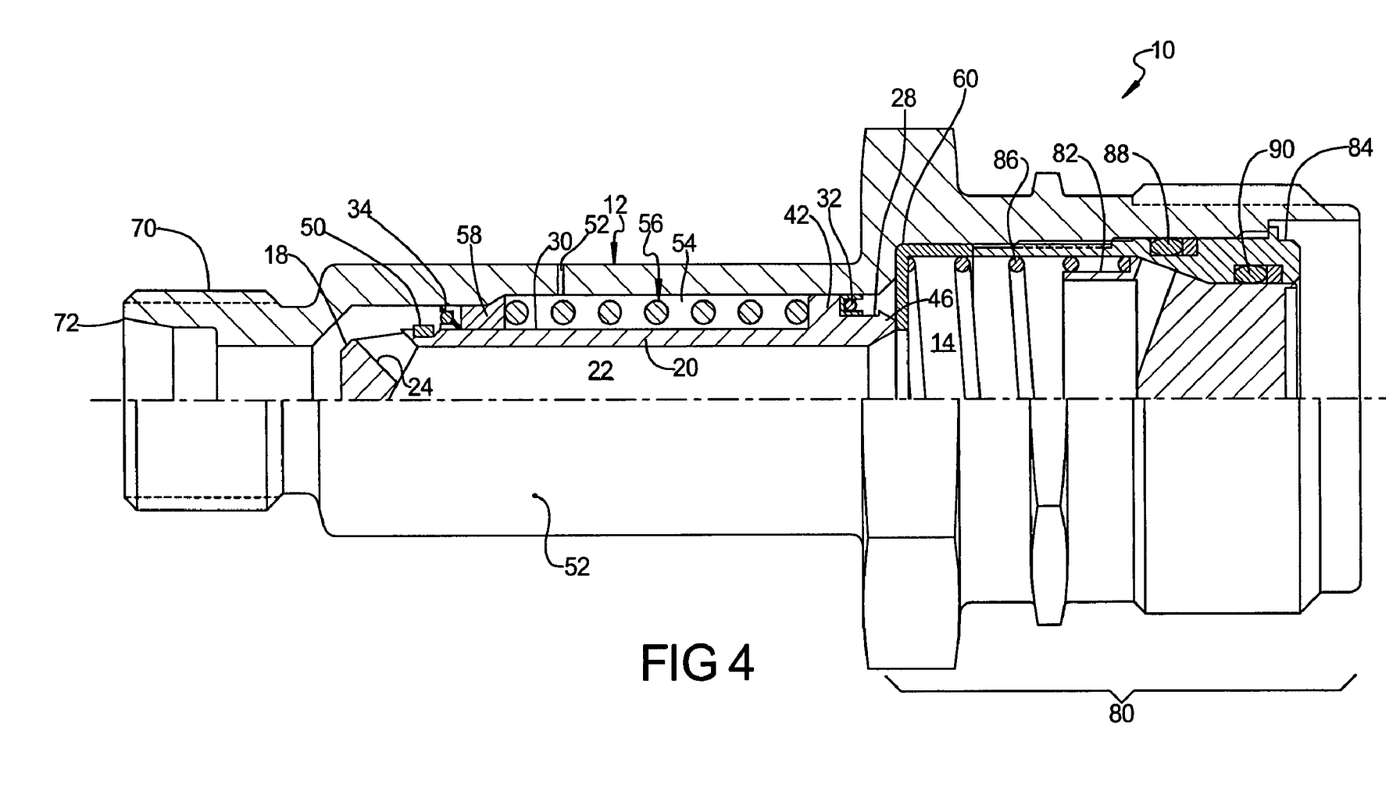
FIG. 4 is a partial cross-sectional view of a valve assembly according to another embodiment of the present invention, showing a valve in an open position.
Figure 5:
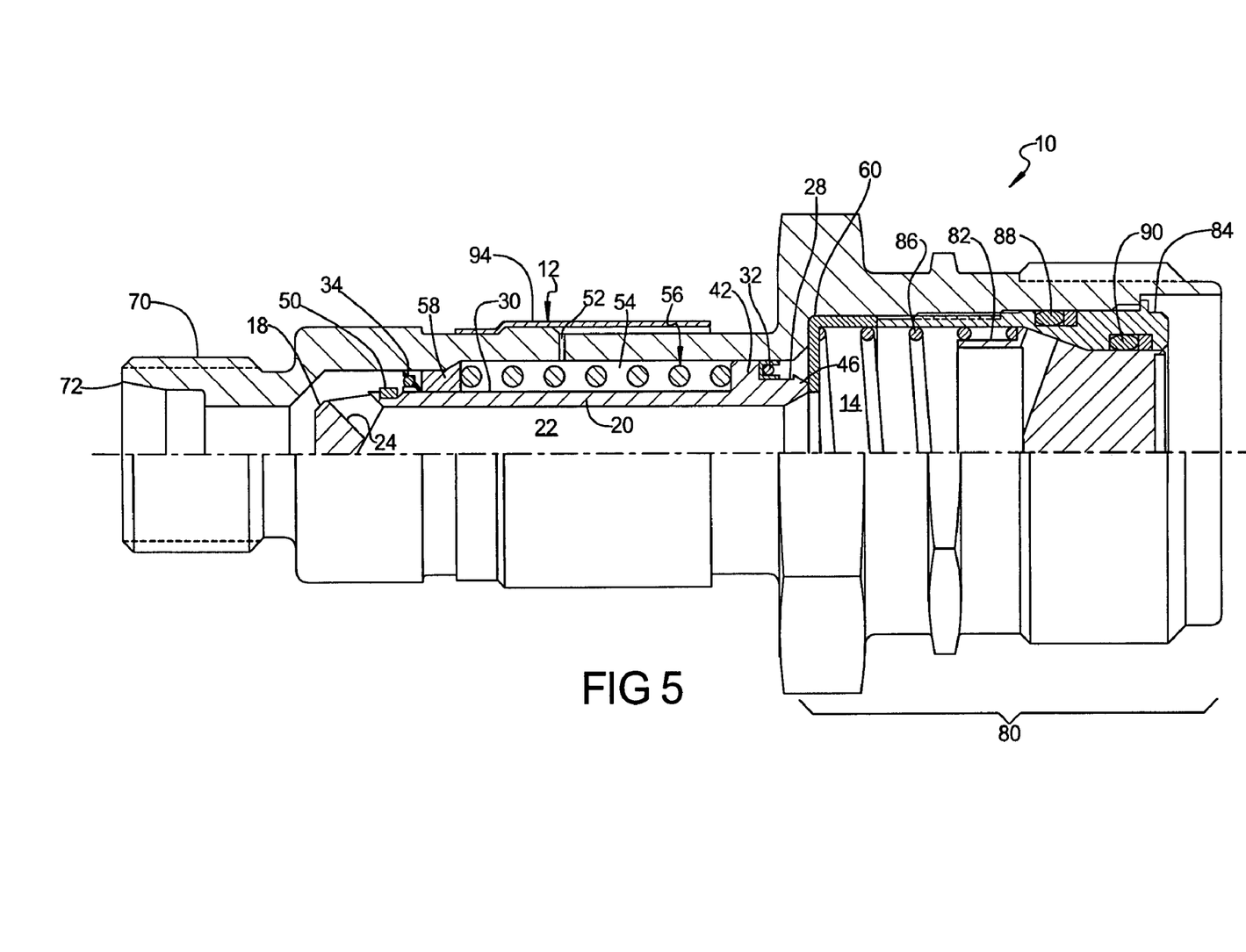
FIG. 5 is a partial cross-sectional view of the valve assembly of FIG. 4 shown with an optional sleeve.

Alternatively, valve assembly 10 may be configured as a coupling or an adapter configured to mate with a threaded or quick-connect/disconnect style fitting (not shown). For example, as shown in FIG. 4, valve assembly 10 may include a quick-connect coupling portion 80 having an axially moveable coupling valve 82 and a coupling valve retainer 84 that is threaded into body 12 to retain the coupling valve 82 within body 12; however, the coupling configuration shown in FIG. 4 is not intended to be limited thereto. A resiliently compressible member 86, such as a compression spring, is positioned between coupling valve 82 and retainer 60, and biases the coupling valve 82 toward the closed position shown in FIG. 4. A first sealing member 88, such as an O-ring or O-ring/packing ring combination, is positioned between body 12 and coupling valve retainer 84, and a second sealing member 90 is positioned between coupling valve retainer 84 and coupling valve 82 to inhibit fluid leakage between the components. An outer surface of body 12 may also include an optional sleeve 94 (FIG. 5) for preventing bleed hole 52 from becoming clogged with debris.

Figure 6:
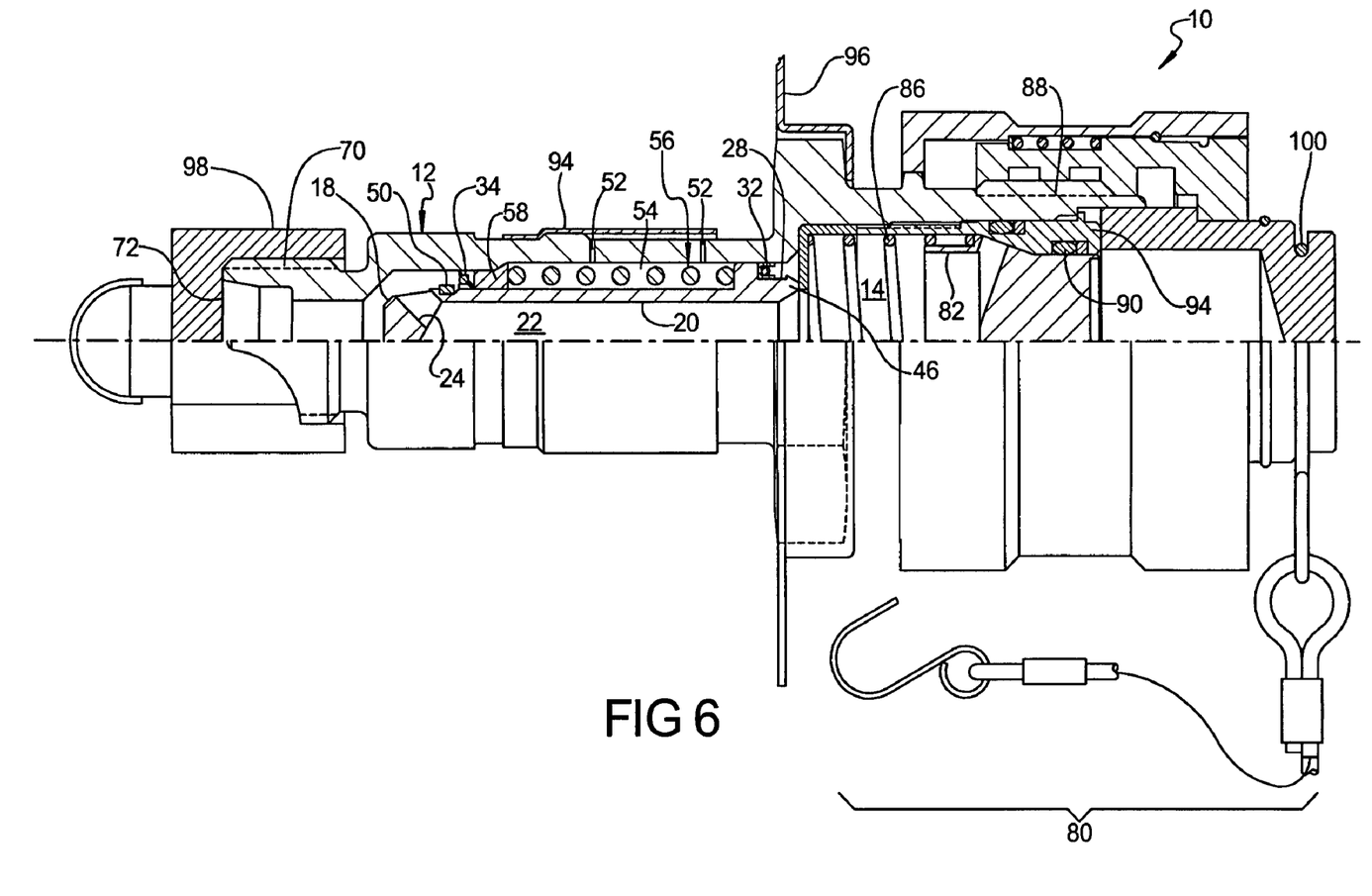
FIG. 6 is a partial cross-sectional view of a valve assembly according to another embodiment of the present invention, showing a valve in an open position.
Figure 7:
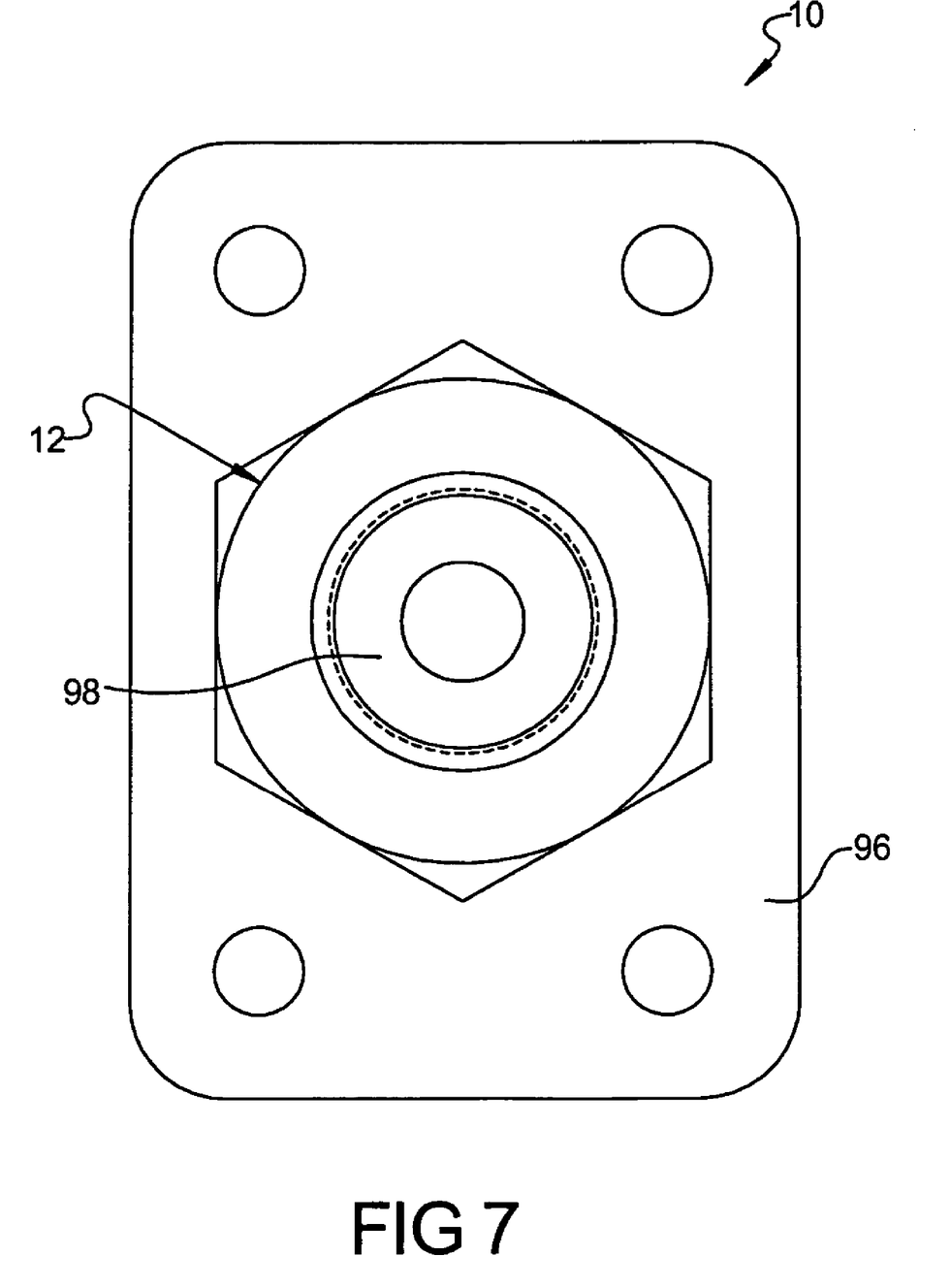
FIG. 7 is an end view of the valve assembly of FIG. 6.

Valve assembly 10 may also be adapted for bulk-head mounting and, when so configured, may include a bulk-head mounting flange 96, as shown in FIGS. 6 and 7. To protect valve assembly 10 during shipping, a cap 98 may be applied to the threaded upstream and downstream ends of body 12 or, when valve assembly 10 includes a quick-connect/disconnect coupling portion 80, a plug 100 may be secured to the quick-connect coupling portion 80 to inhibit dust, dirt and other debris from being received into the bore 14 of valve assembly 10.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A valve assembly, comprising:
   a body including a bore and a longitudinal axis;
   a valve received within the bore and configured for axial movement between an open position in which fluid flow through the body is permitted and a closed position in which fluid flow through the body is prevented;
   first and second sealing members secured for movement with the valve and positioned between the valve and the body such that an internal fluid pressure within the bore is applied to a first side of the first and second sealing members and a common reference pressure is applied to a second side of the first and second sealing members, a first surface area portion of the bore adjacent the first sealing member is greater than a second surface area portion of the bore adjacent second sealing member such that an axial force imparted on the valve adjacent the second sealing member is less than an axial force imparted on the valve adjacent the first sealing member;
   a resiliently compressible member positioned to bias the valve toward the open position; and
   wherein the valve is normally in the open position and is configured to move directly to the closed position such that the valve will not return to the open position from an intermediate travel position when the internal fluid pressure exceeds a predetermined pressure, and wherein the valve is adapted to return from the closed position to the open position when the internal fluid pressure is less than the predetermined pressure.

2. The valve assembly of claim 1, wherein the first and second sealing members each include an open end and a closed end, and wherein the internal fluid pressure is applied to the open end and the common reference pressure is applied to the closed end.

3. The valve assembly of claim 1, wherein the first and second sealing members are spring energized seals that include a polymeric U-cup and a spring received in a U-shaped opening of the U-cup.

4. The valve assembly of claim 1, wherein the resiliently compressible member is a compression spring.

5. The valve assembly of claim 1, wherein a first end of the resiliently compressible member abuts an exterior shoulder of the valve and a second end of the resiliently compressible member abuts an internal shoulder of the body.

6. The valve assembly of claim 5, wherein the internal shoulder of the body is a spring seat that is received in the body with the valve member and is inhibited from axial movement in at least one direction by virtue of its engagement with the body.

7. The valve assembly of claim 1, wherein the resiliently compressible member is pre-loaded when the valve is received in the body.

8. The valve assembly of claim 7, wherein the amount of pre-load is generally equal to the difference in surface area of the first and second sealing members multiplied by the predetermined pressure, minus a combined static break-away force of the first and second sealing members.

9. The valve assembly of claim 1, wherein the predetermined pressure is approximately equal to the pressure at which the force imparted on the valve adjacent the first sealing member exceeds a sum of the forces imparted on the valve adjacent the second sealing member and the resiliently compressible member, and a combined static break-away force require to unseat first and second sealing members from their stationary engagement with an inner wall of the bore.

10. The valve assembly of claim 1, wherein the internal fluid pressure at which the valve returns to the open position is approximately one-fifth the predetermined pressure.

11. The valve assembly of claim 1, wherein the valve assembly also includes a quick connect coupling portion having an axially moveable coupling valve and a coupling valve retainer that is threaded into the body to retain the coupling valve within the body.

12. A valve assembly, comprising:
a body including a longitudinal axis, a bore and at least one bleed hole that provides an exterior of the body in communication with the bore;
a valve received within the bore and configured for axial movement between an open position in which fluid flow through the body is permitted and a closed position in which fluid flow through the body is prevented;
first and second sealing members secured for axial movement with the valve and adapted to provide a seal between the valve and the body, the sealing members positioned axially fore and aft of the bleed hole such that each sealing member is subjected to an external fluid pressure and an internal fluid pressure within the bore of the valve body;
a resiliently compressible member positioned to bias the valve toward the open position; and wherein the valve is normally in the open position and is configured to move directly to the closed position such that the valve will not return to the open position from an intermediate travel position when the internal fluid pressure exceeds a predetermined pressure; and
wherein the valve is adapted to return from the closed position to the open position when the internal fluid pressure is less than the predetermined pressure.

13. The valve assembly of claim 12, wherein a first surface area portion of the bore adjacent the first sealing member is greater than a second surface area portion of the bore adjacent second sealing member such that an axial force imparted on the valve adjacent the second sealing member is less than an axial force imparted on the valve adjacent the first sealing member.

14. The valve assembly of claim 12, wherein the first and second sealing members each include an open end and a closed end, and wherein the external fluid pressure is applied to the closed end and the internal fluid pressure is applied to the open end.

15. The valve assembly of claim 12, wherein the first and second sealing members are spring energized seals that include a polymeric U-cup and a spring received in a U-shaped opening of the U-cup.

16. The valve assembly of claim 12, wherein a first end of the resiliently compressible member abuts an exterior shoulder of the valve and a second end of the resiliently compressible member abuts an internal shoulder of the body.

17. The valve assembly of claim 16, wherein the internal shoulder of the body is a spring seat that is received in the body with the valve member and is inhibited from axial movement in at least one direction by virtue of its engagement with the body.

18. The valve assembly of claim 12, wherein the resiliently compressible member is pre-loaded when the valve is received in the body, the amount of pre-load generally equal to the difference in surface area of the sealing members multiplied by the predetermined pressure, minus a combined static break-away force of the first and second sealing members.

19. The valve assembly of claim 12, wherein the predetermined pressure is approximately equal to the pressure at which the force imparted on the valve adjacent the first sealing member exceeds a sum of the forces imparted on the valve adjacent the second sealing member and the resiliently compressible member and a combined static break-away force require to unseat first and second sealing members from their stationary engagement with an inner wall of the bore.

20. The valve assembly of claim 12, wherein the internal fluid pressure at which the valve returns to the open position is approximately one-fifth the predetermined pressure.

21. The valve assembly of claim 12, wherein the valve assembly also includes a quick connect coupling portion having an axially moveable coupling valve and a coupling valve retainer that is threaded into the body to retain the coupling valve within the body.

22. The assembly of claim 12, wherein a portion of the body surrounding the valve and the first and second sealing members comprises a single inner unitary part surface.

23. A valve assembly, comprising:
a body including a bore and a longitudinal axis;
a valve received within the bore and configured for axial movement between an open position in which fluid flow through the body is permitted and a closed position in which fluid flow through the body is prevented;
first and second sealing members secured for movement with the valve and positioned between the valve and the body such that an internal fluid pressure within the bore is applied to a first side of the first and second sealing members and a common reference pressure is applied to a second side of the first and second sealing members, a first surface area portion of the bore adjacent the first sealing member is greater than a second surface area portion of the bore adjacent second sealing member such that an axial force imparted on the valve adjacent the second sealing member is less than an axial force imparted on the valve adjacent the first sealing member; and a resiliently compressible member positioned to bias the valve toward the open position;

wherein the first and second sealing members each include a closed end, an open end, and a spring received in the open end; the valve is normally in the open position and is configured to move directly to the closed position such that the valve cannot return to the open position from an intermediate travel position when the internal fluid pressure exceeds a predetermined pressure; and the valve is adapted to return from the closed position to the open position when the internal fluid pressure is less than the predetermined pressure.

* * * * *